US012736910B2

(12) United States Patent
Mori

(10) Patent No.: US 12,736,910 B2
(45) Date of Patent: Sep. 15, 2026

(54) CONVEYING SCREW AND IMAGE FORMING APPARATUS

(71) Applicant: KYOCERA Document Solutions Inc., Osaka (JP)

(72) Inventor: Hayato Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/073,789

(22) Filed: Mar. 7, 2025

(65) Prior Publication Data

US 2025/0291301 A1 Sep. 18, 2025

(30) Foreign Application Priority Data

Mar. 18, 2024 (JP) ................................ 2024-041841

(51) Int. Cl.
*G03G 15/08* (2006.01)
*G03G 21/10* (2006.01)

(52) U.S. Cl.
CPC ....... *G03G 21/105* (2013.01); *G03G 15/0891* (2013.01)

(58) Field of Classification Search
CPC ............. G03G 15/0891; G03G 21/105; G03G 2215/0827; B65G 33/26
See application file for complete search history.

(56) References Cited

U.S. PATENT DOCUMENTS

2013/0216288 A1 8/2013 Murata et al.
2018/0253033 A1* 9/2018 Fujishima .......... G03G 15/0891
2018/0267429 A1 9/2018 Okuno
2020/0142334 A1 5/2020 Watanabe

FOREIGN PATENT DOCUMENTS

JP 2001-350336 A 12/2001

OTHER PUBLICATIONS

Extended European Search Report issued in EP 25 16 1497.0-1001 by the European Patent Office on Aug. 21, 2025, which is related to U.S. Appl. No. 19/073,789.

* cited by examiner

*Primary Examiner* — Sophia S Chen
(74) *Attorney, Agent, or Firm* — Studebaker Brackett PLLC

(57) ABSTRACT

The conveying screw includes a conveying blade and a pair of supporting portions. The conveying blade is provided spirally along a conveyance direction of powder. The pair of supporting portions is provided at both end portions of the conveying blade in the conveyance direction. The conveying blade is formed by alternately arranging a plurality of semicircular blade plates on one side and the other side across a rotational center, and connecting the one blade plate and the other blade plate adjacent to the conveyance direction. One blade plate and the other blade plate adjacent to the conveyance direction constitute a pair of blade plates having reversed inclinations with respect to the conveyance direction. A part of the pairs of blade plates constitutes a large-diameter blade part having a larger outer diameter than the other part of the pairs of blade plates.

4 Claims, 6 Drawing Sheets

CONVEYING SCREW AND IMAGE FORMING APPARATUS

INCORPORATION BY REFERENCE

This application is based on and claims the benefit of priority from Japanese patent application No. 2024-041841 filed on Mar. 18, 2024 which is incorporated by reference in its entirety.

BACKGROUND

The present disclosure relates to a conveying screw and an image forming apparatus.

In the image forming apparatus, a conveying screw having a spiral blade formed on the outer circumferential surface of a rotational shaft is used for conveying toner. In this conveying screw, if the toner adheres to the rotational shaft and fills a space between the spiral blades, the conveying of the toner is sometimes impossible. Therefore, there has been proposed a conveying screw in which the rotational shaft is eliminated by leaving only both end portions of the rotational shaft, and the both end portions are connected only by the spiral blade.

The conveying screw, in which the spiral blade has no rotational shaft, tends to be deflected in the longitudinal direction (the axial direction) and oscillates in the radial direction with the rotation around the axis. For this reason, a part of the spiral blade having a large amplitude (displacement due to deflection), such as near the center of the spiral blade in the longitudinal direction, is struck against the inner surface of a toner conveyance path, and an abnormal sound (collision sound) is sometimes generated.

SUMMARY

A conveying screw according to the present disclosure conveys powder while rotating around an axis. The conveying screw includes a conveying blade and a pair of supporting portions. The conveying blade is provided spirally along a conveyance direction of the powder. The pair of supporting portions is provided at both end portions of the conveying blade in the conveyance direction. The conveying blade is formed by alternately arranging a plurality of semicircular blade plates on one side and the other side across a rotational center, and connecting the one blade plate and the other blade plate adjacent to the conveyance direction. One blade plate and the other blade plate adjacent to the conveyance direction constitute a pair of blade plates having reversed inclinations with respect to the conveyance direction. A part of the pairs of blade plates constitutes a large-diameter blade part having a larger outer diameter than the other part of the pairs of blade plates.

An image forming apparatus according to the present disclosure includes the conveying screw and a unit case. The unit case supports the conveying screw rotatably around an axis, and has a conveying channel for conveying the powder by the conveying screw. A part of the conveying channel where the large-diameter part is in contact forms a sliding surface having a low frictional coefficient than the other ort of the conveying channel.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
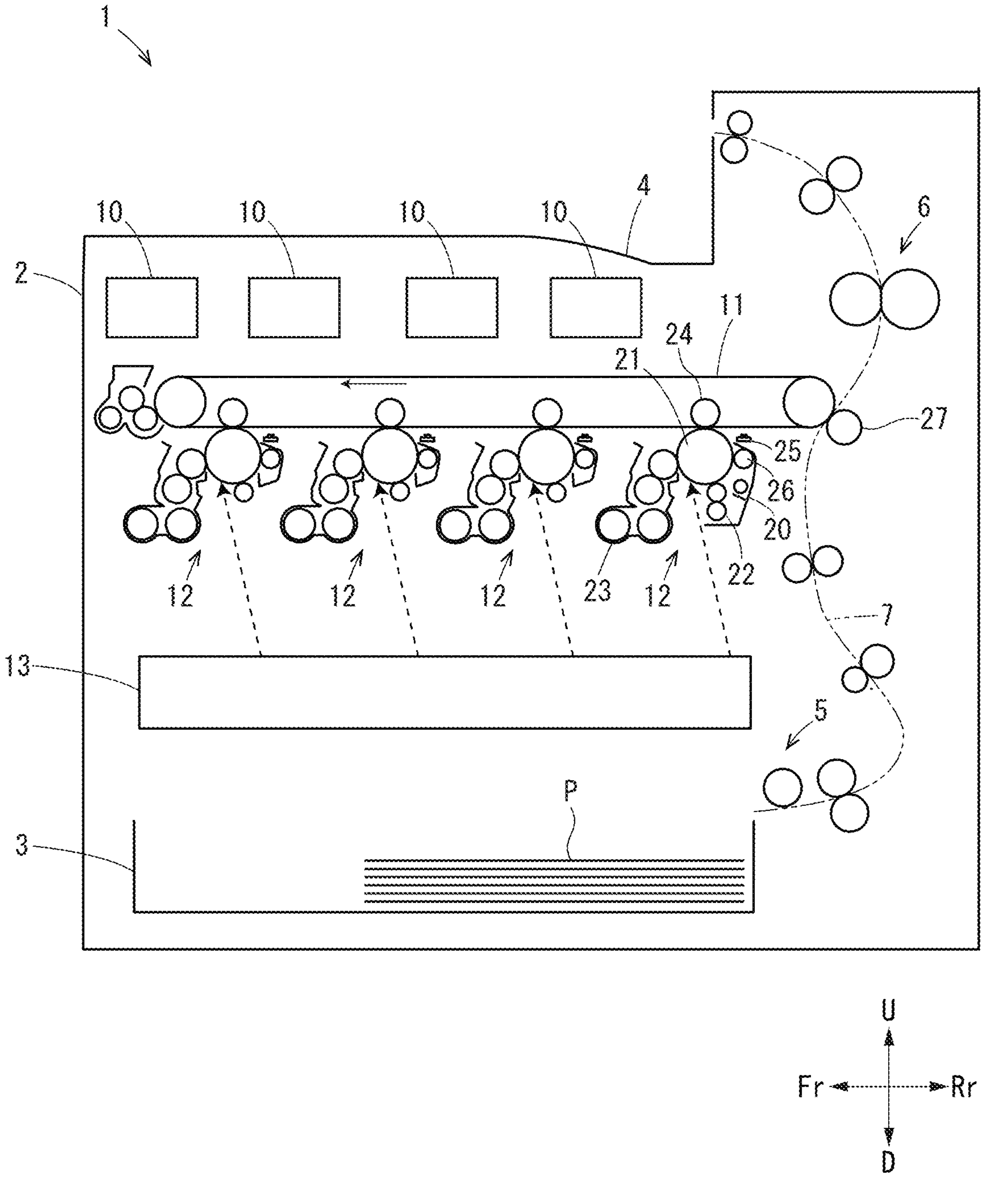
FIG. 1 is a schematic view (side view) showing an internal structure of an image forming apparatus according to one embodiment of the present disclosure.

Hereinafter, with reference to the attached drawings, an embodiment of the present disclosure will be described. Fr, Rr, L, R, U and D shown in the drawings indicate the front, rear left, right, upper and down. Although terms showing direction and position are used herein, these terms are used for convenience of description and do not limit the technical scope of the present disclosure.

[Image forming apparatus] With reference to FIG. 1, the image forming apparatus 1 will be described. FIG. 1 is a schematic view (side view) showing the internal structure of the image forming apparatus 1.

The image forming apparatus 1 is, for example, a printer which forms (prints) an image on a paper P by an electrophotographic method. The image forming apparatus 1 includes a box-shaped apparatus main body 2. In the lower portion in the apparatus main body 2, a paper feeding cassette 3 which stores a bundle of the papers P is detachably attached. The paper discharge tray 4 on which the image-formed paper P is received is provided on the upper surface of the apparatus main body 2. A paper conveyance path 7 along which the paper P is conveyed from the paper feeding cassette 3 to the paper discharge tray 4 is provided inside the apparatus main body 2. A paper feeding part 5 is provided on the upstream side of the paper conveyance path 7, and a fixing part 6 is provided on the downstream side of the paper conveyance path 7. The paper P is not limited to a paper sheet but may be a resin film or the like.

Four toner containers 10 are arranged in the front-and-rear direction below the paper discharge tray 4. The four toner containers 10 contain replenishment toner of four colors (yellow, magenta, cyan, and black) (an example of powder). An intermediate transfer belt 11 is provided below the four toner containers 10, and is wound around a plurality of rollers. A secondary transfer roller 27 is in contact with the rear side portion of the intermediate transfer belt 11. Below the intermediate transfer belt 11, four photosensitive drum units 12 are arranged in the front-and-rear direction. Below the four photosensitive drum units 12, an exposure unit 13 is provided. Since the four photosensitive drum units 12 have the same structure, one photosensitive drum unit 12 will be mainly described below.

The photosensitive drum unit 12 includes a photosensitive drum 21 rotationally driven in contact with the intermediate transfer belt 11. A charging device 22, a developing device 23, a primary transfer roller 24, a static eliminator 25, and a cleaning device 26 are arranged around the photosensitive drum 21 in the order of the image forming process. The photosensitive drum 21 faces the primary transfer roller 24 across the intermediate transfer belt 11. The photosensitive drum 21, the charging device 22 and the cleaning device 26 are attached to a unit case 20 to constitute the photosensitive drum unit 12.

[Image Forming Process] An image forming process by the image forming apparatus 1 will now be described. The image forming apparatus 1 forms an image on the paper P based on image data transmitted from an external terminal (personal computer, or the like).

The charging device 22 charges the surface of the photosensitive drum 21. The exposure unit 13 performs exposure corresponding to the image data to the photosensitive drum 21 to form an electrostatic latent image on the surface of the photosensitive drum 21. The developing device 23 develops the electrostatic latent image on the photosensitive drum 21 into a toner image by using the toner supplied from the toner container 10. The four color toner images carried on the four photosensitive drums 21 are sequentially primary transferred to the intermediate transfer belt 11 by the primary transfer rollers 24 to which a primary transfer bias is applied. Thus, a full-color toner image is formed on the surface of the intermediate transfer belt 11.

The paper P is fed from the paper feeding cassette 3 to the paper conveyance path 7 by the paper feeding part 5, and the toner image carried on the intermediate transfer belt 11 is secondarily transferred to the paper P by the secondary transfer roller 27 to which a secondary transfer bias is applied. The toner image is thermally fixed to the paper P by the fixing part 6, and then the paper P is discharged to the paper discharge tray 4. The static eliminator 25 removes the charge of the photosensitive drum 21, and the cleaning device 26 removes the toner remaining on the surface of the photosensitive drum 21.

Figure 2:
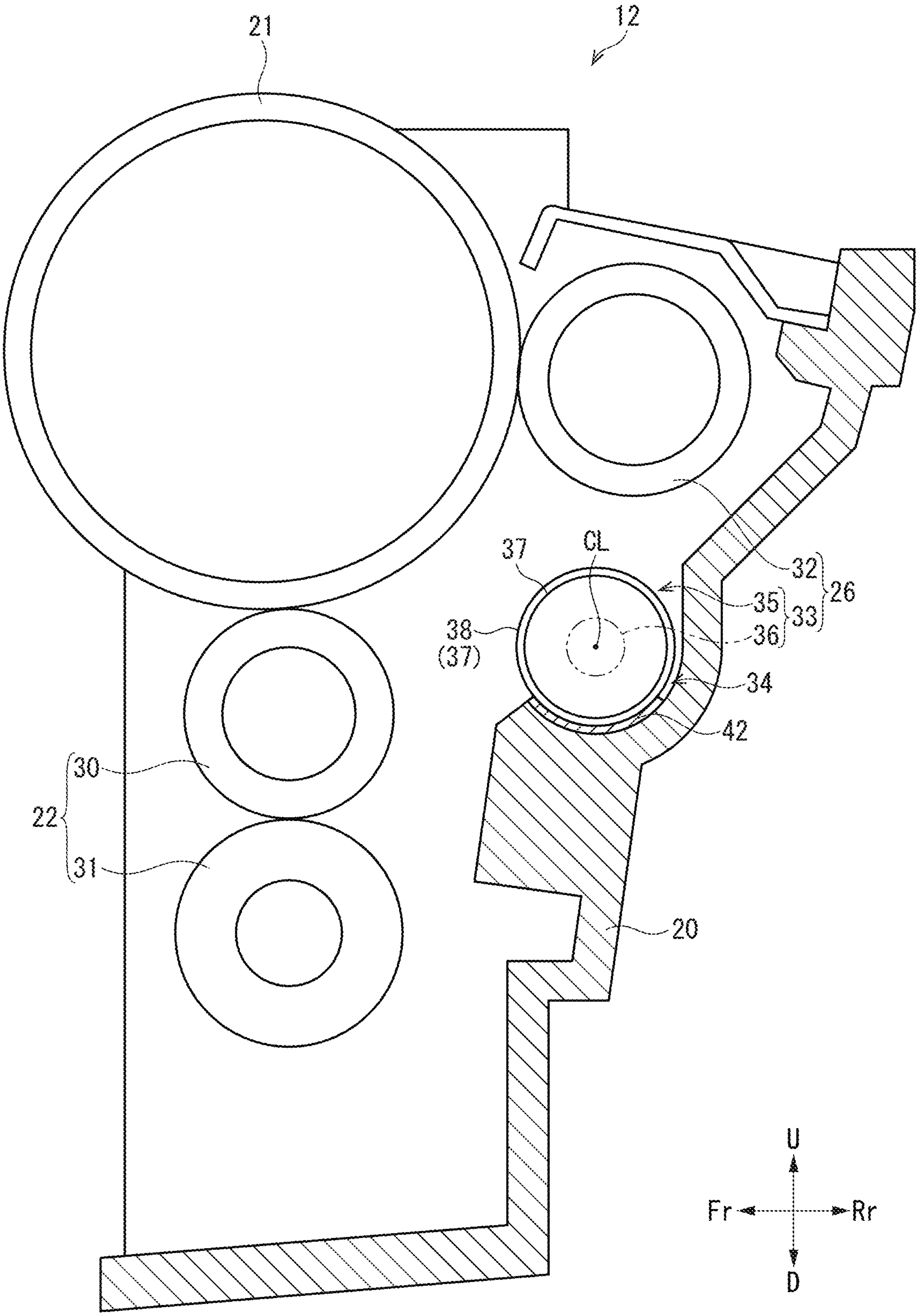
FIG. 2 is a schematic view (side view) showing the internal structure of a photosensitive unit of the image forming apparatus according to the embodiment of the present disclosure.

[Photosensitive Drum Unit] The photosensitive drum unit 12 will be described with reference to FIG. 2. FIG. 2 is a schematic view (side view) showing the internal structure of the photosensitive drum unit 12.

The photosensitive drum unit 12 includes the unit case 20, the photosensitive drum 21, the charging device 22, and the cleaning device 26. The photosensitive drum 21 is supported in the upper portion in the unit case 20, the charging device 22 is provided in the lower portion in the unit case 20, and the cleaning device 26 is provided on the rear portion in the unit case 20. The unit case 20 is made of, for example, synthetic resin.

The charging device 22 includes a charging roller 30 in contact with the lower portion of the photosensitive drum 21 and a charging cleaning roller 31 in contact with the lower portion of the charging roller 30. The charging roller 30 and the charging cleaning roller 31 are supported by the unit case 20, and rotatable around axes. The charging roller 30 rotates in contact with the surface of the photosensitive drum 21 to uniformly charge the surface of the photosensitive drum 21. The charging cleaning roller 31 rotates while coming into contact with the charging roller 30 to clean the surface of the charging roller 30.

The cleaning device 26 includes a cleaning roller 32 in contact with the rear portion of the photosensitive drum 21 and a conveying screw 33 positioned below the cleaning roller 32. The cleaning roller 32 and the conveying screw 33 are supported by the unit case 20, and rotatable around axes. The cleaning roller 32 rotates while coming into contact with the surface of the photosensitive drum 21 to remove the toner (hereinafter, referred to as "waste toner") remaining on the surface of the photosensitive drum 21.

A conveying channel 34 in which the conveying screw 33 is arranged is formed in the rear portion in the unit case 20. The conveying channel 34 is formed in a substantially semicylindrical shape extending in the left-and-right direction and expanding downward. The inner surface of the conveying channel 34 has no irregularities and has a smooth curved surface in the left-and-right direction (conveyance direction). The conveying channel 34 serves as a path (flow path) for conveying the waste toner by the conveying screw 33, and a waste toner box (not shown) for storing the waste toner is connected to a downstream end (for example, a left end) of the conveying channel 34. The waste toner on the surface of the photosensitive drum 21 is scraped off by the cleaning roller 32 and falls toward the conveying channel 34. The conveying screw 33 rotates around the axis and conveys the waste toner received by the conveying channel 34 toward the waste toner box.

In many general screws, a spiral blade is formed on an outer circumferential surface of a rotational shaft. In such a screw, the waste toner adheres to the rotational shaft and fills the space between the spiral blades, and sometimes the waste toner cannot be conveyed (toner clogging). Therefore, the present embodiment employs the conveying screw 33 in which the rotational shaft is eliminated except for both end portions in the axial direction.

Figure 3:
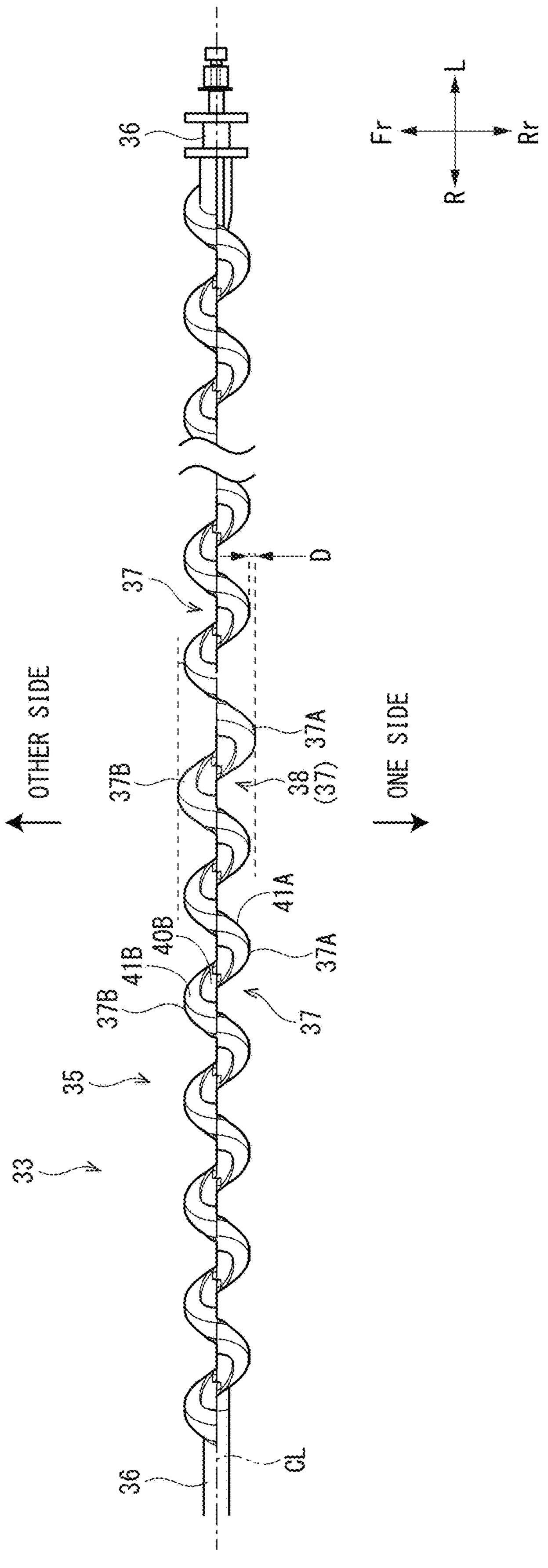
FIG. 3 is a plan view showing a conveying screw according to the embodiment of the present disclosure.
Figure 4:
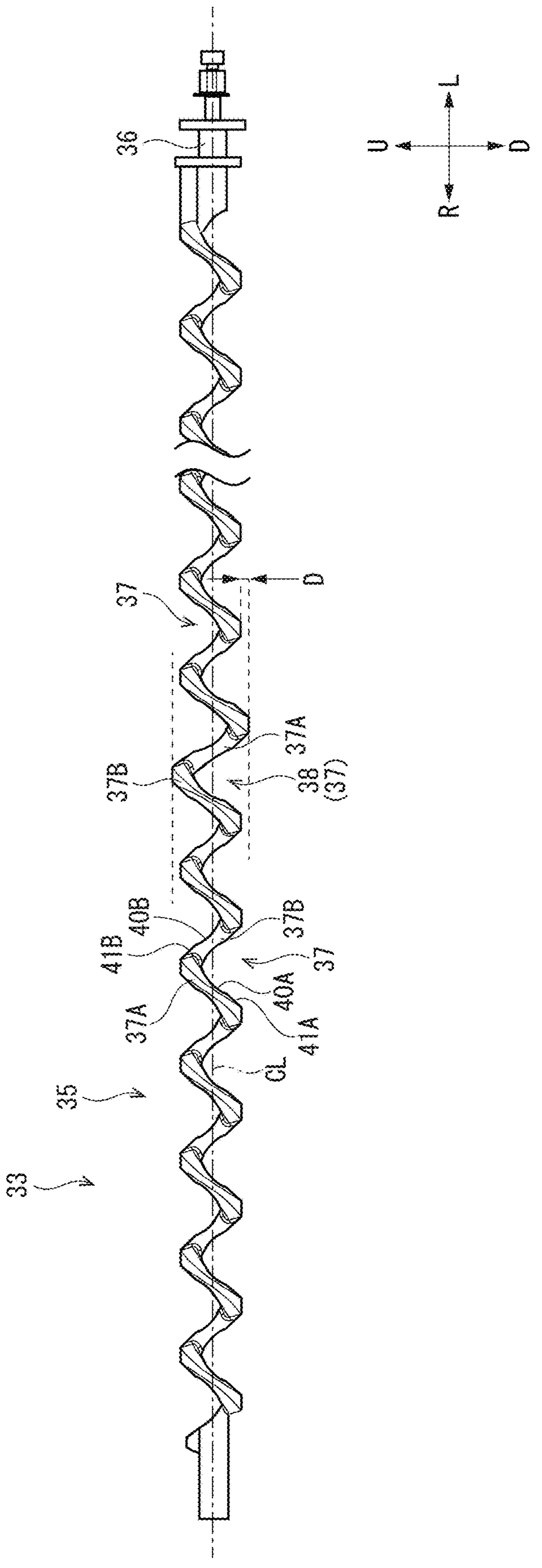
FIG. 4 is a rear view of the conveying screw according to the embodiment of the present disclosure.
Figure 5:
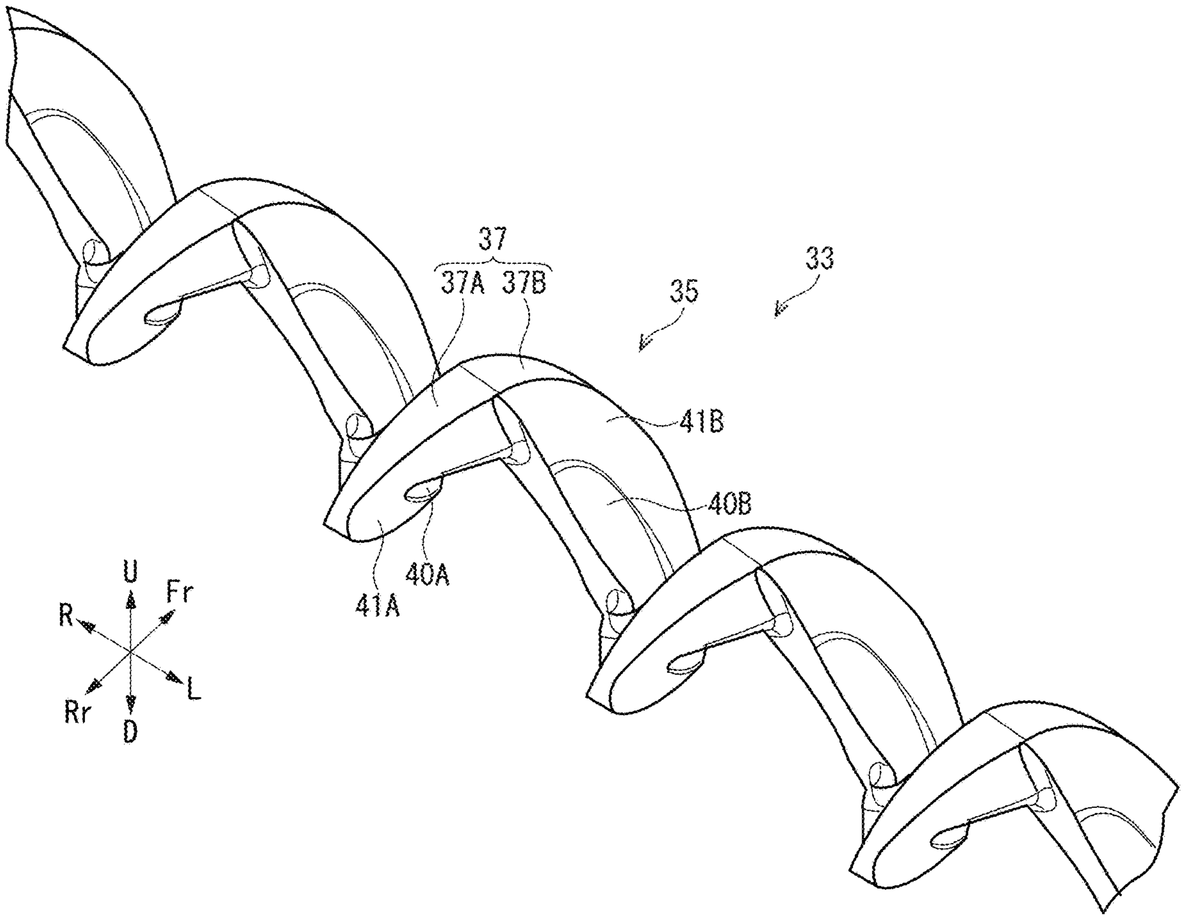
FIG. 5 is a perspective view showing a portion of the conveying screw according to the embodiment of the present disclosure.
Figure 6:
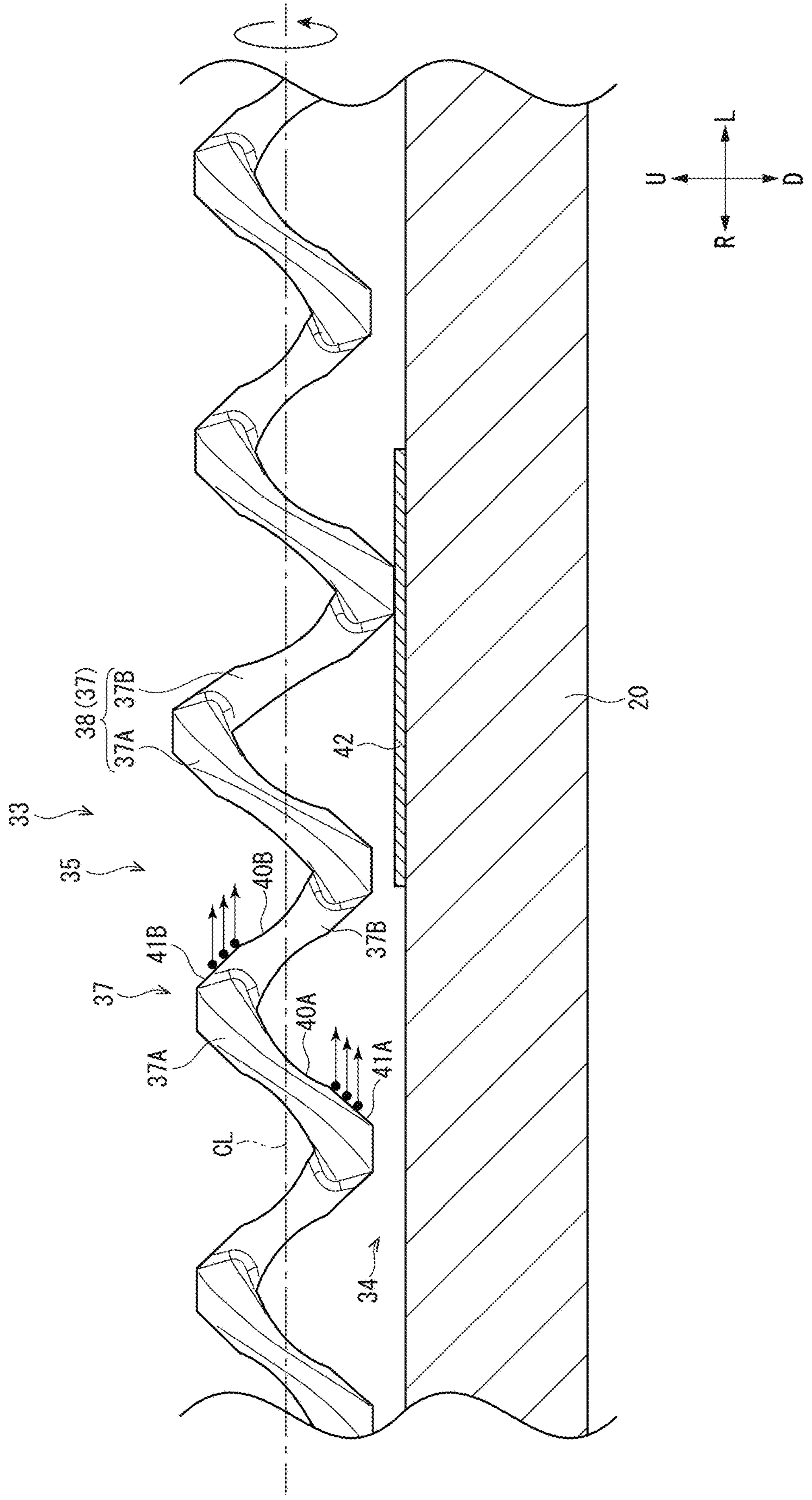
FIG. 6 is a rear view explaining a conveying operation of the conveying screw according to the embodiment of the present disclosure.

[Conveying Screw] With reference to FIG. 2 to FIG. 6, the conveying screw 33 will be described. FIG. 3 is a plan view showing the conveying screw 33. FIG. 4 is a rear view showing the conveying screw 33. FIG. 5 is a perspective view showing a part of the conveying screw 33. FIG. 6 is a rear view for explaining the conveying operation of the conveying screw 33. In this specification, as an example, a direction in which the waste toner is conveyed from the right side to the left side is referred to as the "conveyance direction".

As shown in FIG. 2 to FIG. 4, the conveying screw 33 has a conveying blade 35 and a pair of supporting portions 36. The conveying screw 33 is, for example, made of synthetic resin and integrally molded by injection molding.

The supporting portions 36 are positioned at both end portions in the left-and-right direction (the conveyance direction (axial direction)), and the conveying blades 35 are provided between the supporting portions 36. The conveying blade 35 is formed in a spiral shape along the left-and-right direction (conveyance direction). A rotational shaft is not formed at the axial center of the conveying blade 35, and the supporting portions 36 are provided at (only) both end portions of the conveying blade 35 in the left-and-right direction (conveyance direction). Each of the supporting portions 36 is formed in a substantially cylindrical shape, and is supported by a bearing (not shown) of the unit case 20. One supporting portion 36 is connected to a motor (not shown) via a power transmission mechanism (not shown) such as a gear train, and the conveying screw 33 is driven to be rotated around the axis by the motor.

<Conveying Blade> As shown in FIG. 3, the conveying blade 35 is formed by alternately arranging semicircular blade plates 37A and 37B on one side and the other side across the rotational center CL, and connecting one blade plate 37A and the other blade plate 37B adjacent in the conveyance direction. One blade plate 37A and the other blade plates 37B are arranged in such a manner that the chord of the semicircle is directed toward the rotational center CL and the outer circumferential surface of the semicircle is directed outward in the radial direction. That is, one blade plate 37A and the other blade plate 37B are inverted across the rotational center CL when viewed from a plane. Since the blade plates 37A have substantially the same shape and the blade plates 37B have substantially the same shape, one blade plate 37A and one blade plate 37B will be mainly described below.

As shown in FIG. 4 and FIG. 5, one blade plate 37A is inclined upward from the upstream to the downstream in the conveyance direction when viewed from the rear side (front side), and the other blade plate 37B is inclined downward from the upstream to the downstream in the conveyance direction when viewed from the rear side (front side). One blade plate 37A and the other blade plate 37B adjacent to each other in the conveyance direction constitute a pair of blade plates 37 in which the inclinations of the blade plates with respect to the conveyance direction are reversed when viewed from the rear side (front side). The plurality of pairs of blade plates 37 are connected in the left-and-right direction (conveyance direction) to form the conveying blade 35. The outer circumferential surfaces of the pairs of blade plates 37 (blade plates 37A, 37B) are spirally connected.

The inclinations of one and the other blade plates 37A, 37B with respect to the conveyance direction are shallow (45 degrees or less) when viewed from the rear side (front side), and an angle formed by the blade plates 37A, 37B adjacent to the conveyance direction is obtuse. Therefore, when the conveying screw 33 is injection-molded by using a mold in which a cavity corresponding to the conveying blade 35 is formed, the molten resin filled from one end side of the cavity easily spreads to the entire cavity. Thus, only a single gate is formed in the mold, and the manufacturing cost of the mold can be kept low. Further, the weld of the conveying screw 33 (conveying blade 35) can be reduced, and the strength of the conveying blade 35 can be improved.

As shown in FIG. 3 to FIG. 5, one and the other blade plates 37A and 37B have central conveying portions 40A and 40B for conveying the waste toner around the rotational center CL. The plate surfaces of the central conveying portions 40A and 40B are formed in a concave shape in a cross-sectional view. The blade plates 37A and 37B have peripheral conveying portions 41A and 41B for conveying the waste toner outside the central conveying portions 40A and 40B in the radial direction.

The blade plates 37A and 37B are formed to have a thickness sufficient to allow the molten resin to spread throughout the mold cavity. Since the peripheral conveying portions 41A and 41B are not concave, they are formed thicker than the central conveying portions 40A and 40B. Since the adjacent blade plates 37A, 37B in the conveyance direction are coupled at the thick portions of the peripheral conveying portions 41A, 41B, the strength of the coupling portion can be increased, and the conveying screw 33 is hardly damaged.

Incidentally, since there is no rotational shaft of the conveying blade 35, the conveying screw 33 tends to be deflected in the conveyance direction (axial direction or longitudinal direction), and sometimes vibrates in the radial direction (direction perpendicular to the conveyance direction) with the rotation around the axis. Therefore, a part where the amplitude (displacement due to deflection) becomes large, such as near the center of the conveying blade 35 in the conveyance direction, is struck against the inner surface of the conveying channel 34 of the waste toner, and an abnormal sound (collision sound) is sometimes generated. Therefore, the conveying screw 33 according to the present embodiment has a structure for suppressing the vibration in the radial direction due to the rotation around the axis.

<Large-Diameter Blade Part> As shown in FIG. 2 to FIG. 4, in the conveying screw 33 according to the present embodiment, a part of the pairs of blade plates 37 constituting the conveying blade 35 constitutes a large-diameter blade part 38 having a larger outer diameter (diameter) than the other of the pairs of blade plates 37. As a specific example, the large-diameter blade part 38 is one pair of blade plates 37 among the pairs of blade plates 37, and is located in the center region of the conveying blade 35 in the left-and-right direction (conveyance direction (axial direction)). A difference D in the outer diameter (diameter) between the large-diameter blade part 38 and the other pairs of blade plates 37 is, for example, about 1 mm (see FIG. 3 and FIG. 4). The "outer diameter" of the pair of blade plates 37 (the large-diameter blade part 38) means a length of a line segment which passes through the rotational center CL and has both ends on the outer circumferential surfaces of the blade plates 37A and 37B when the conveying screw 33 is viewed from the axial direction. The "center region" of the conveying blade 35 includes a center in the left-and-right direction (conveyance direction) and a range deviated from the center by several millimeters to about ten millimeters.

As shown in FIG. 2 and FIG. 6, the conveying screw 33 is supported by the unit case 20, and rotates while bringing the radial outer end of the large-diameter blade part 38 into contact with the inner surface (surface) of the conveying channel 34. The radial outer ends of the other pairs of blade plates 37 do not come into contact with the inner surface (surface) of the conveying channel 34, or come into contact with less pressure than the large-diameter blade part 38. A portion of the conveying channel 34 in contact with the large-diameter blade part 38 constitutes a sliding surface portion having a lower friction coefficient than other portions of the conveying channel 34. Specifically, a slide sheet 42 as an example of a sliding surface portion is fixed (adhered) to the inner surface (surface) of the central region of the conveying channel 34 in the left-and-right direction (the conveyance direction), that is, a position with which the large-diameter blade part 38 comes into contact. The slide sheet 42 is, for example, a polymeric polyethylene sheet, and has a lower friction coefficient than the synthetic resin forming the unit case 20.

Next, the conveying operation by the conveying screw 33 will be described with reference to FIG. 6.

When the conveying screw 33 rotates around the rotational center CL, one blade plate 37A moves downward and the other blade plate 37B moves upward when viewed from the rear side (front side). The waste toner is pushed out to the downstream side in the conveyance direction along the slope of the blade plate 37A while pushed down by the blade plate 37A. Further, the waste toner is pushed out to the downstream side in the conveyance direction along the slope of the blade plate 37B while pushed up by the blade plate 37B. That is, the waste toner (see the black dots shown in FIG. 6) is conveyed so as to be pushed out by the blade plates 37A and 37B with the rotation of the conveying screw 33. Since the central conveying portions 40A and 40B are formed in a concave shape in the blade plates 37A and 37B, the waste toner near the rotational center CL is pushed out to the downstream side in the conveyance direction while being scooped.

In the conveying screw 33 according to the present embodiment, the rotational shaft of the conveying blade 35 is eliminated in order to suppress accumulation of the waste toner near the rotational center CL. It is known that the conveyance efficiency (conveyance amount of the waste toner) of the conveying screw 33 having no rotational shaft is lower than that of the screw having the rotational shaft. Therefore, the applicant compares the conveyance efficiency of the waste toner using a screw having a spiral blade fixed to a rotational shaft (Comparative Example 1 (not shown)), a screw having a spiral conveying blade having no rotational shaft (the central conveying portions 40A and 40B are not provided) (Comparative Example 2 (not shown)), and the conveying screw 33 of the present embodiment. When the toner conveyance efficiency by the screw of Comparative Example 1 is assumed to be 100%, the toner conveyance efficiency by the screw of Comparative Example 2 is 90%, while the toner conveyance efficiency by the conveying screw 33 of this embodiment is 95 to 98%. As described above, according to the conveying screw 33 according to the present embodiment, the toner clogging can be prevented by eliminating the rotational shaft of the conveying blade 35, and the deterioration in the conveyance efficiency of the toner can be minimized.

In the conveying screw 33 according to the present embodiment described above, a part of the pairs of blade plates 37 constitutes the large-diameter blade part 38 having a larger outer diameter than the other part of the pairs of blade plates 37. According to this configuration, the conveying screw 33 can be rotated around the axis while the large-diameter blade part 38 is in positive contact with the inner surface of the conveying channel 34. Thus, the vibration in the radial direction of the conveying screw 33 rotating around the axis can be suppressed. As a result, since a portion of the conveying blade 35 is not struck against the inner surface of the conveying channel 34, the occurrence of abnormal noise (collision noise) can be suppressed.

Further, according to the conveying screw 33 according to the present embodiment, since the large-diameter blade part 38 comes into contact with the inner surface of the conveying channel 34 at the center region in the conveyance direction (longitudinal direction) which is most likely to be deflected, the vibration of the conveying screw 33 in the radial direction can be effectively suppressed.

In the conveying screw 33 according to the present embodiment, the central conveying portions 40A and 40B are formed on the side of the rotational center CL of the conveying blade 35, and the plate surfaces of the central conveying portions 40A and 40B are formed concave in a cross-sectional view. According to this configuration, since the central conveying portions 40A and 40B rotate while scooping the waste toner near the rotational center CL, it is possible to increase an amount of the waste toner to be conveyed. As a result, even in the conveying screw 33 (conveying blade 35) in which the rotational shaft is eliminated, lowering of conveyance efficiency can be suppressed.

In the image forming apparatus 1 according to the present embodiment described above, the slide sheet 42 having a high slidability is provided on the portion of the conveying channel 34 where the large-diameter blade part 38 is in contact with. According to this configuration, the large-diameter blade part 38 can be smoothly rotated while being brought into contact with the slide sheet 42. Thus, the wear of the large-diameter blade part 38 can be suppressed, and the occurrence of abnormal noises such as contact noises can be suppressed. Further, since the conveying screw 33 according to the present embodiment is used in the image forming apparatus 1, toner clogging in the conveying screw 33 can be suppressed, so that an image of good quality can be formed.

In this embodiment, the large-diameter blade part 38 provided on a part of the conveying screw 33 (conveying blade 35) is in contact with the inner surface of the conveying channel 34, thereby suppressing the vibration of the conveying screw 33 in the radial direction. As another structure for suppressing the vibration of the conveying screw 33 in the radial direction, it is conceivable that the conveying blade 35 of the conveying screw 33 (the pair of blade plates 37) has a constant outer diameter in the conveyance direction, a projection is provided on a part of the inner surface of the conveying channel 34, and the projection is brought into contact with the conveying blade 35 of the conveying screw 33 (not shown). When the conveying screw 33 is assembled to the unit case 20, the conveying screw 33 is often inserted from one end of the conveying channel 34 in the axial direction (conveyance direction) toward the other end. When the projection is provided on a part of the inner surface of the conveying channel 34 as described above, the conveying screw 33 inserted in the axial direction may interfere with the projection, and the conveying screw 33 may not be smoothly inserted into the conveying channel 34. On the other hand, in the present embodiment, since no projection or the like is provided on the inner surface of the conveying channel 34 and the large-diameter blade part 38 is provided on a part of the conveying blade 35, the conveying screw 33 can be smoothly inserted into the conveying channel 34.

In the conveying screw 33 according to the present embodiment, the large-diameter blade part 38 is one pair of blade plates 37 positioned in the center region of the conveying blade 35 in the conveyance direction (axial direction), but the present disclosure is not limited thereto. For example, the large-diameter blade part 38 may be a plurality (two or more) pairs of blade plates 37. In this case, a plurality of successive pairs of blade plates 37 may be provided in the central region of the conveying blade 35 in the conveyance direction, or a plurality pairs of blade plates 37 may be provided at a plurality of positions with intervals in the conveyance direction (not shown). Further, one pair of blade plates 37 may be provided at a position deviated from the central region in the conveyance direction (not shown).

In the image forming apparatus 1 according to the present embodiment, the slide sheet 42 is fixed to a part of the conveying channel 34 where the large-diameter blade part 38 is in contact with, but the present disclosure is not limited thereto. A portion of the conveying channel 34 (unit case 20) may be formed of material having a lower coefficient of friction than other portions. Alternatively, a paint having a low friction coefficient may be applied to a part of the conveying channel 34.

Further, although the conveying screw 33 according to the present embodiment is provided for conveyance of the waste toner in the photosensitive drum unit 12, it is not limited to this, and can be used for conveyance of various powders, for example, for conveyance of the toner while stirring in the developing device 23.

Further, in the description of the present embodiment, as an example, a case in which the disclosure of the present disclosure is applied to the image forming apparatus 1 (printer) is shown, but the present disclosure is not limited thereto, and the present disclosure may be applied to, for example, a multifunction peripheral, a copying machine, or a facsimile machine.

It should be noted that the description of the above-described embodiment shows one aspect of the conveying screw and the image forming apparatus according to the present disclosure, and the technical range of the present disclosure is not limited to the above-described embodiment. The present disclosure may be varied, replaced, and modified without departing from the spirit of the technical thought, and the scope of the claims includes all embodiments which may be included within the scope of the technical thought.

The invention claimed is:

1. A conveying screw which conveys powder while rotating around an axis, the conveying screw comprising:

a conveying blade provided spirally along a conveyance direction of the powder; and a pair of supporting portions provided only at both end portions of the conveying blade in the conveyance direction and not provided in a section of the conveying blade, wherein the conveying blade is formed by alternately arranging a plurality of semicircular blade plates on one side and the other side across a rotational center, and connecting the blade plate on one side and the blade plate on the other side which are adjacent to the conveyance direction, the blade plate on one side and the blade plate on the other side which are adjacent to the conveyance direction constitute a plurality of pairs of blade plates having reversed inclinations with respect to the conveyance direction, and a part of the plurality of pairs of blade plates constitutes a large-diameter blade part having a larger outer diameter than the other part of the pairs of blade plates.

2. The conveying screw according to claim 1, wherein the large-diameter blade part is at least one pair of blade plates among the plurality of pairs of blade plates, and positioned in a center region of the conveying blade in the conveyance direction.

3. An image forming apparatus comprising:

the conveying screw according to claim 1, and a unit case which supports the conveying screw rotatably around an axis, and has a conveying channel for conveying the powder by the conveying screw, wherein a part of the conveying channel where the large-diameter part is in contact forms a sliding surface having a low frictional coefficient than the other part of the conveying channel.

4. An conveying screw which conveys powder while rotating around an axis, the conveying screw comprising:

a conveying blade provided spirally along a conveyance direction of the powder; and a pair of supporting portions provided only at both end portions of the conveying blade in the conveyance direction and not provided in a section of the conveying blade, wherein the conveying blade is formed by alternately arranging a plurality of semicircular blade plates on one side and the other side across a rotational center, and connecting the blade plate on one side and the blade plate on the other side which are adjacent to the conveyance direction, the blade plate on one side and the blade plate on the other side which are adjacent to the conveyance direction constitute a plurality of pairs of blade plates having reversed inclinations with respect to the conveyance direction, a part of the plurality of pairs of blade plates constitutes a large-diameter blade part having a larger outer diameter than the other part of the pairs of blade plates, the blade plate on one side and the blade plate on the other side have central conveying portions which convey the powder around the rotational center, and a blade surface of the central conveying portion is formed in a recessed shape in a cross-sectional view.

* * * * *